(12) United States Patent
Autry

(10) Patent No.: US 11,358,348 B2
(45) Date of Patent: Jun. 14, 2022

(54) MOLD INSERT FOR USE WITH A MANDREL FOR FORMING A COMPOSITE STRUCTURE

(71) Applicant: The Boeing Company, Chicago, IL (US)

(72) Inventor: Byron James Autry, Charleston, SC (US)

(73) Assignee: THE BOEING COMPANY, Chicago, IL (US)

( * ) Notice: Subject to any disclaimer, the term of this patent is extended or adjusted under 35 U.S.C. 154(b) by 683 days.

(21) Appl. No.: 16/238,177

(22) Filed: Jan. 2, 2019

(65) Prior Publication Data

US 2020/0207036 A1    Jul. 2, 2020

(51) Int. Cl.
*B29C 70/54* (2006.01)
*B29C 70/30* (2006.01)
*B29L 31/30* (2006.01)

(52) U.S. Cl.
CPC ............. *B29C 70/54* (2013.01); *B29C 70/30* (2013.01); *B29L 2031/3082* (2013.01)

(58) Field of Classification Search
CPC ....... B29C 70/541; B29C 33/42; B29C 57/02; B29C 33/485
See application file for complete search history.

(56) References Cited

U.S. PATENT DOCUMENTS

| | | | | |
|---|---|---|---|---|
| 3,775,238 A | * | 11/1973 | Lyman | B29C 70/08 428/167 |
| 4,492,607 A | * | 1/1985 | Halcomb | B29C 70/083 156/242 |
| 4,633,632 A | * | 1/1987 | Sarh | B29C 53/70 52/245 |
| 4,721,593 A | * | 1/1988 | Kowal | B29C 70/44 156/156 |
| 4,822,272 A | * | 4/1989 | Yanase | B29C 33/04 156/173 |
| 4,826,106 A | * | 5/1989 | Anderson | B29D 24/007 244/117 R |
| 4,946,526 A | * | 8/1990 | Petty-Galis | B29C 33/448 156/155 |
| 5,170,967 A | * | 12/1992 | Hamamoto | B29C 53/805 244/119 |
| 6,234,423 B1 | * | 5/2001 | Hirahara | B64C 3/18 244/123.7 |
| 6,458,309 B1 | * | 10/2002 | Allen | B29C 70/446 264/319 |
| 6,613,258 B1 | * | 9/2003 | Maison | B29C 66/112 264/102 |
| 8,016,970 B2 | | 9/2011 | Dull et al. | |
| 8,157,212 B2 | | 4/2012 | Biornstad et al. | |
| 9,039,858 B2 | | 5/2015 | Dull et al. | |
| 9,352,514 B2 | | 5/2016 | Nguyen et al. | |

(Continued)

*Primary Examiner* — Matthew J Daniels
(74) *Attorney, Agent, or Firm* — Coats & Bennett, PLLC

(57) ABSTRACT

A mold insert and method of using a mold insert to make a composite part. The mold insert is configured to make a composite part from composite material. The mold insert is configured to be attached to a mandrel. Once attached, the composite material is applied to the mandrel over the mold insert, stringers, and bladders. The composite material is then cured on the mandrel. The mold insert can then be removed from the mandrel.

20 Claims, 11 Drawing Sheets

(56) References Cited

U.S. PATENT DOCUMENTS

| | | | |
|---|---|---|---|
| 2006/0231682 A1* | 10/2006 | Sarh | B64C 1/068 244/119 |
| 2010/0000667 A1* | 1/2010 | Funnell | B29C 33/48 156/189 |
| 2010/0239865 A1* | 9/2010 | Kallinen | B29D 99/0014 428/411.1 |
| 2014/0374010 A1* | 12/2014 | Nguyen | B29C 33/38 156/166 |

* cited by examiner

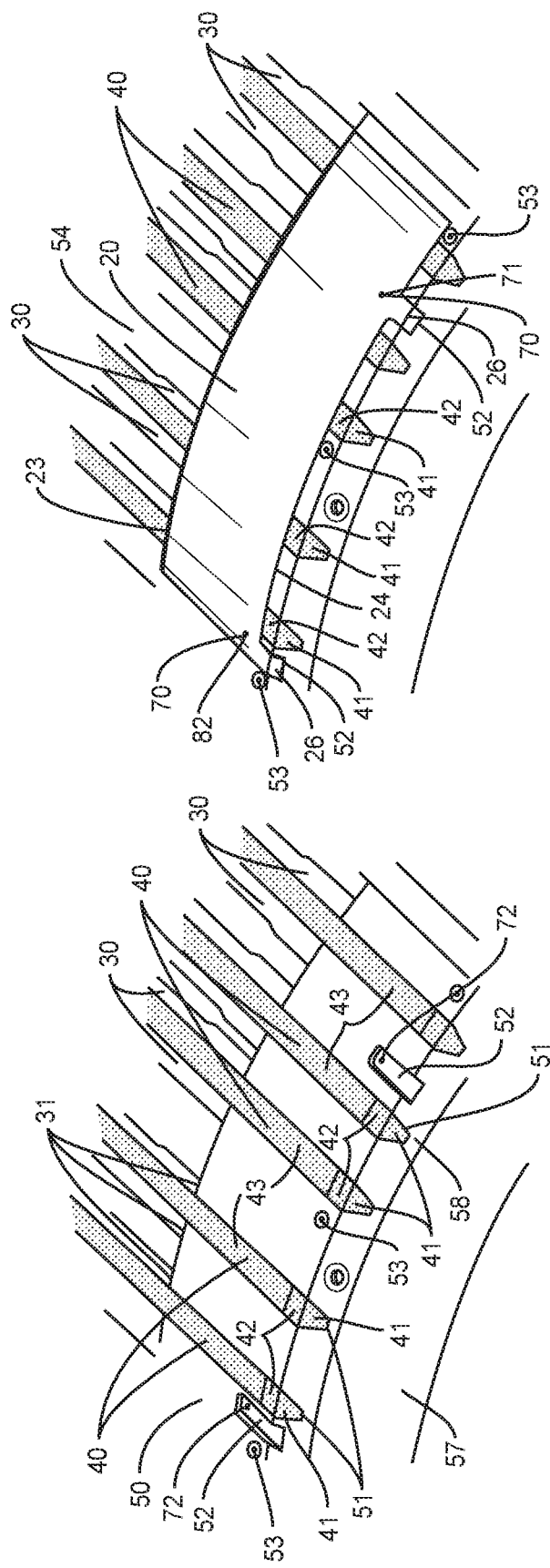

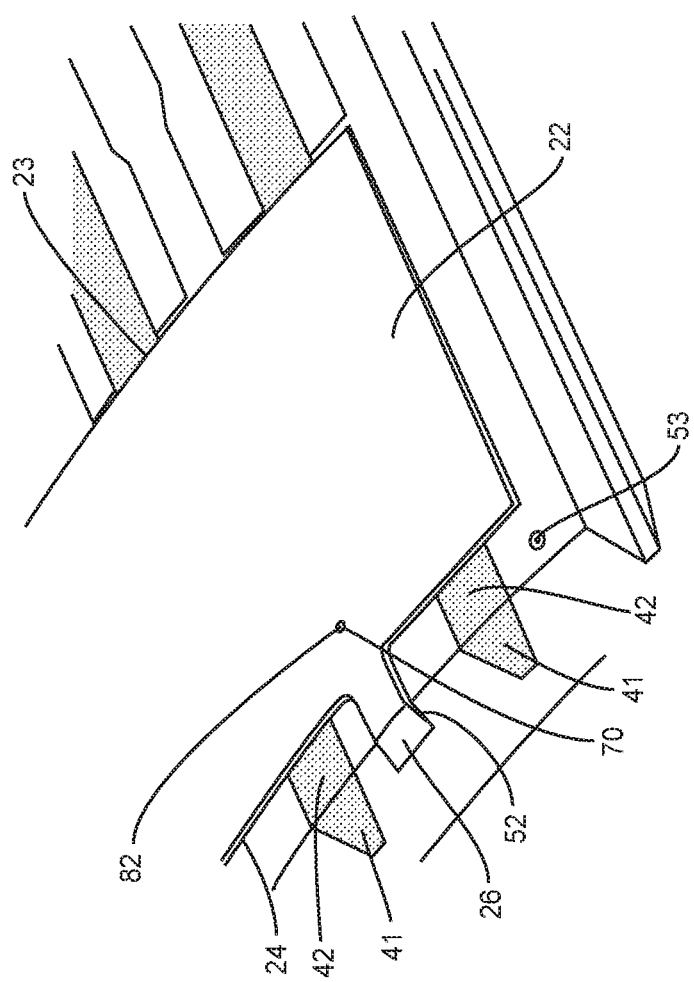

MOLD INSERT FOR USE WITH A MANDREL FOR FORMING A COMPOSITE STRUCTURE

TECHNOLOGICAL FIELD

The present disclosure relates generally to tools and methods in connection with the formation of a composite structure about a mandrel and, more specifically, to formation of a composite structure using a mold insert with the mandrel.

BACKGROUND

Vehicles, including aircraft, are being designed and manufactured with greater percentages of composite materials. Some vehicles may have more than fifty percent of its primary structure made from composite materials. Composite materials may be tough, light-weight materials, created by combining two or more dissimilar components. For example, fibers and resins may be combined to form a cured composite material.

By using composite materials, portions of a vehicle may be created in larger pieces or sections. For example, cylindrical sections that may be put together to form the fuselage of the aircraft. Other examples include without limitation sections joined to form a wing or a stabilizer.

During the formation of elongated composite components, it may be desirable to maintain certain flatness tolerances along one or more sections. For example, in the manufacture of elongated sections which are subsequently joined together end to end to form the vehicle fuselage, it may be desirable to maintain certain flatness along sections that may receive splice elements which serve to bridge the interface between abutting fuselage sections and serve to join such sections to one another. If the desired flatness is not maintained during the formation of the fuselage sections on the mandrel, then rework, shimming, etc. may be required in the joining of adjacent fuselage sections to one another.

For example, certain composite fuselages may be fabricated using a mandrel with troughs running the length of the mandrel. The length of a trough may be filled with an inflatable bladder. The bladder is flexible and not a hard tool surface. Therefore it may depress as a fiber placement machine compressively applies an application loading on the surface of the bladder during lay-up of the composite material on the mandrel. This may result in surface waviness in the finished composite structure. Specifically, the result may include the inner mold line (IML) at the ends of fuselage sections not meeting flatness tolerances. In such an event, subsequent post-cure works may be required at the ends of the fuselage sections to maintain or accommodate flatness tolerances.

SUMMARY

One aspect is directed to a mold insert that includes a plate with an inner side and an opposing outer side. The plate also includes a first edge and an opposing second edge with each of the first and second edges extending between the inner and outer sides. The plate has a tapering thickness measured between the inner and outer sides that increases from the first edge. Ramps are spaced-apart along the inner side with each of the ramps extending inward from the first edge towards the second edge. The ramps are recessed into the inner side and have a depth that tapers and decreases away from the first edge. One or more indexing lugs extend outward from the inner side and from the second edge.

In another aspect, the plate includes a width measured between the first and second edges and each of the ramps extends a limited distance along the width from the first edge.

In another aspect, the plate includes a length measured between a first lateral side and a second lateral side with the ramps being spaced apart along the length.

In another aspect, the plate also includes non-tapered sections along the first edge laterally between the ramps with the non-tapered sections having a greater thickness than the ramps at the first edge.

In another aspect, the plate comprises a width measured between the first and second edges with the tapered thickness of the plate extending a limited distance along the width from the first edge.

One aspect is directed to a mold system that includes a mandrel with a length measured between first and second ends and a width measured between first and second sides. The mandrel includes: troughs that extend along the length and that are laterally spaced apart along the width; and receptacles that are spaced away from the troughs. A mold insert includes: a plate with an inner side and an opposing outer side, a first edge and an opposing second edge with the plate having a thickness measured between the inner and outer sides that increases from the first edge. Indexing lugs extend outward from the inner side and are sized to fit within the receptacles. Ramps are spaced-apart along the inner side. The mold insert is configured to attach to the mandrel with the indexing lugs mounted in the receptacles to position the plate across the receptacles and the ramps over the troughs.

In another aspect, the indexing lugs extend outward from the second edge of the plate and away from the first edge.

In another aspect, the mandrel includes optical tooling points and the mold insert is configured to be spaced away from the optical tooling points when attached to the mandrel.

In another aspect, each of the ramps extends inward from the first edge towards the second edge with the ramps being recessed into the inner side and having a depth that tapers and decreases away from the first edge.

One aspect is directed to a method of forming a composite component. The method includes installing stringers and bladders into troughs in a mandrel with the stringers and bladders being laterally spaced apart along the mandrel. The method includes attaching a mold insert onto the mandrel with the mold insert extending over the bladders and aligning tapering ramps on an inner side of the mold insert with the bladders. The method includes applying a composite material onto the mandrel with the composite material extending over the stringers, the bladders, and the mold insert. The method includes curing the composite material. The method includes detaching the mold insert from the mandrel and sliding the mold insert out from under the composite material after it has been cured. The method includes sliding the bladders out of the troughs in the mandrel and out from under the composite material.

In another aspect, the method includes attaching the mold insert over the bladders with ends of the bladders extending outward beyond the mold insert.

In another aspect, the method includes fastening lugs on the mold insert into receptacles in the mandrel with the lugs positioned between adjacent ones of the bladders.

In another aspect, attaching the mold insert onto the mandrel includes inserting fasteners through openings in the mold insert and into corresponding openings in the mandrel and recessing the fasteners below an outer side of the insert mold.

In another aspect, applying the composite material onto the mandrel includes applying a fabric onto the mandrel.

In another aspect, the method includes that the mold insert and the bladders are each moved outward from an end of the mandrel and removed from underneath the composite material.

In another aspect, the method includes demolding the composite material from the mandrel after the mold insert and the bladders are removed from the mandrel.

In another aspect, the method includes contacting the tapering ramps against the ends of the bladders.

In another aspect, the method includes spacing the mold insert away from vents on the bladders and from optical tooling points on the mandrel.

In another aspect, the method includes spacing the first edge of the mold insert away from the stringers such that the mold insert does not extend over the stringers.

In another aspect, the method includes positioning the first edge of the plate towards the stringers and the second edge away from the stringers with the first edge being narrower than the second edge.

The features, functions and advantages that have been discussed can be achieved independently in various aspects or may be combined in yet other aspects further details of which can be seen with reference to the following description and the drawings.

BRIEF DESCRIPTION OF THE DRAWINGS

FIG. 4 is a perspective view of bladders and stringers positioned in troughs of a mandrel.

FIG. 5 is a perspective view of a mold insert attached to a mandrel and extending over bladders.

FIG. 6 is a perspective view of a mold insert attached to a mandrel and extending over bladders.

DETAILED DESCRIPTION

Figure 1:
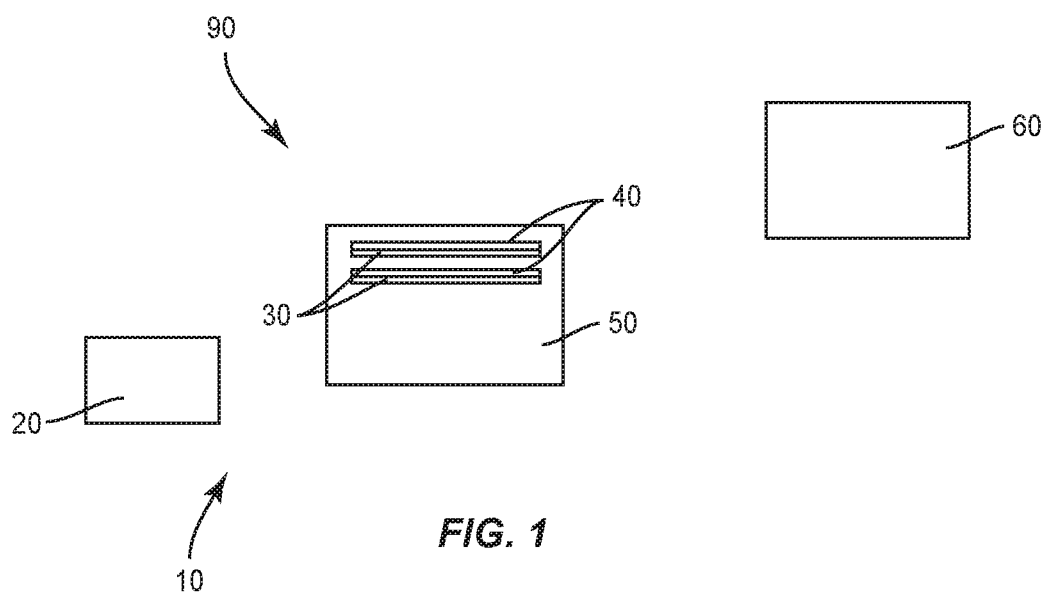
FIG. 1 is a schematic exploded view of a mold insert configured to be attached to a mandrel and with a composite component constructed from a composite material.

The present application is directed to a mold insert and method of using a mold insert to make a composite part. As schematically illustrated in FIG. 1, a mold system 90 includes a mandrel 50 and a mold insert 10 configured to make a composite part from composite material 60. The mold insert 10 is configured to be attached to a mandrel 50. Once attached, the composite material 60 is applied to the mandrel 50 over the mold insert 10, stringers 30, and bladders 40. The composite material is then cured on the mandrel 50. The mold insert 10 can then be removed from the mandrel 50.

Figure 2:
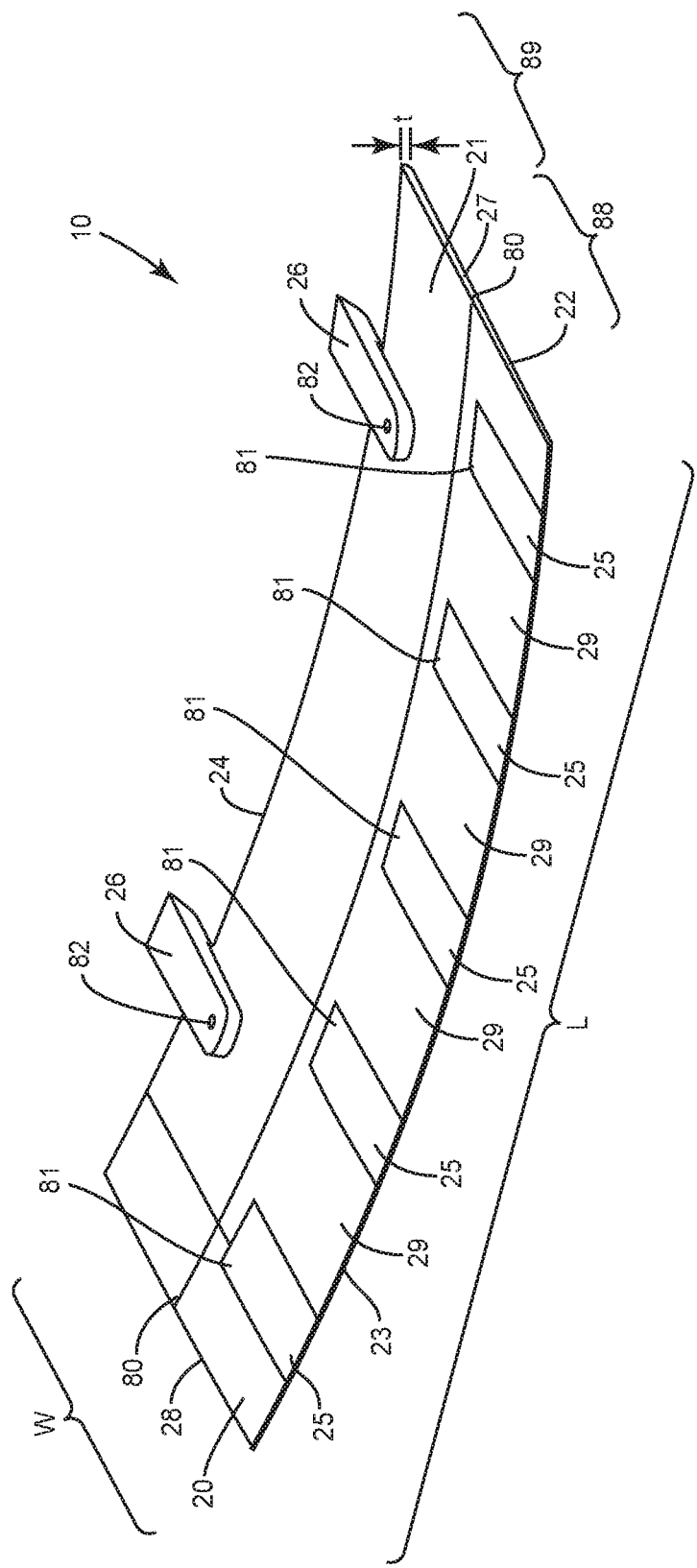
FIG. 2 is a perspective view of an underside of a mold insert.

FIG. 2 illustrates a mold insert 10 configured to be attached to the mandrel 50. The mold insert 10 includes a plate 20 with an inner side 21 and an opposing outer side 22. The plate 20 also includes a first edge 23 and opposing second edge 24. A width W of the plate 20 is measured between the first and second edges 23, 24. The plate 20 also includes first and second lateral sides 27, 28. A length L of the plate 20 is measured between the first and second lateral sides 27, 28.

The plate 20 has a thickness t measured between the inner side 21 and the outer side 22. The thickness t increases from the first edge 23 towards the second edge 24. In one design, the thickness t increases across the entire width W. Another design as illustrated in FIG. 2 includes a first section 88 from the first edge 23 to an intermediate point 80 that has an increasing thickness t, and a second section 89 from the intermediate point 80 to the second edge 24 having a constant thickness t. The widths of the sections 88, 89 may vary with different designs including larger or smaller sections 88, 89. In one design, the first edge 23 has a thickness t of 0.100". The thickness t increases along the first section 88 to a thickness of 0.250". The second section 89 includes a thickness of 0.250".

Ramps 25 are spaced apart along the length L of the plate 20. The ramps 25 extend from a first edge 23 and terminate at an end 81. As illustrated in FIG. 2, the ends 81 of the ramps 25 are positioned at an interior of the plate 20. The ends 81 can be positioned at various locations along the width W of the plate 20. In one design, the ends 81 are positioned at the intermediate point 80. In another design, the ramps 25 extend across the entirety of the width W. Non-tapered sections 29 are positioned between the ramps 25 across the length of the L of the plate 20. The spacing of the ramps 25 across the length L matches the positioning of the bladders 40 along the mandrel 50 as will be explained in more detail below.

The ramps 25 have a tapered thickness that increases from the first edge 23 to the ends 81. The thickness t of the plate 20 along the first edge 23 at the ramps 25 can be less than or equal to the thickness of the remainder of the plate 20 along the first edge 23.

Lugs 26 extend outward from the inner side 21 of the plate 20. The lugs 26 also extend outward beyond the second edge 24. The lugs 26 are sized and configured to engage with the mandrel 50. One or more openings 82 extend through each lug 26 to receive fasteners to secure the mold insert 10 to the mandrel 50. The openings 82 can be countersunk at the outer side 22 such that the fasteners are flush or recessed below the outer side 22 when inserted in the openings 82 and mounted in the mandrel 50.

Figure 3:
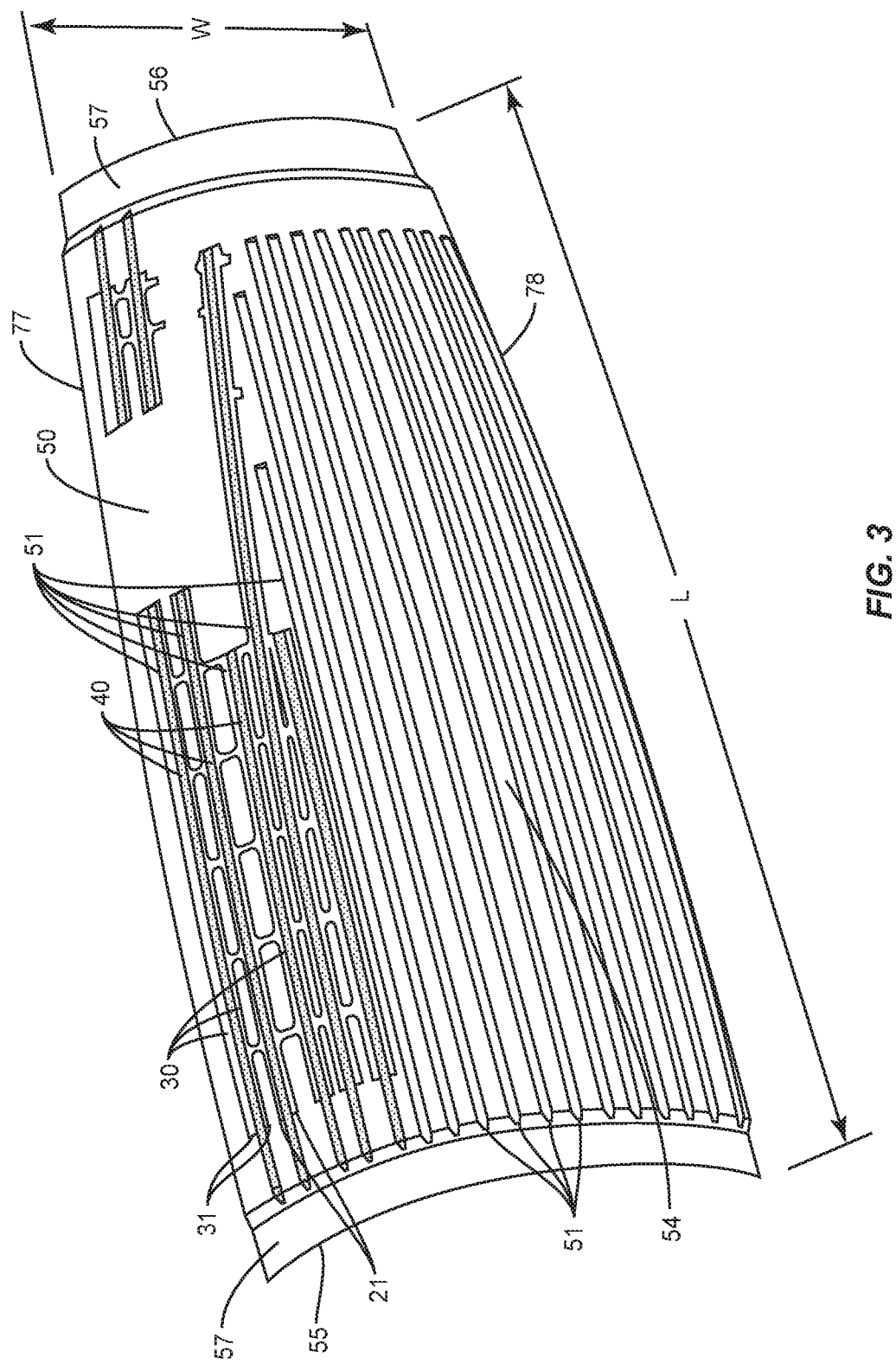
FIG. 3 is a perspective view of bladders and stringers positioned in troughs of a mandrel.

The mold insert 10 is configured to be attached to the mandrel 50. FIG. 3 illustrates a mandrel 50. The mandrel 50 includes a length L measured between a first end 55 and a second end 56, and a width W measured between a first side 77 and a second side 78. A central section 54 of the mandrel 50 is located between flanges 57. The flanges 57 are positioned at each of the first and second ends 55, 56. Troughs 51 are positioned along the central section 54 between flanges 57. The troughs 51 extend longitudinally along the central section 54, and can extend the entirety or a limited portion of the central section 54. The shapes and sizes of the troughs 51 can be the same or different, with each trough 51 configured to receive a bladder 40 and one or more stringers 30.

FIG. 4 illustrates a closer view of the troughs 51 positioned within the central section 54 of the mandrel 50. The troughs 51 are spaced laterally apart. As illustrated in FIG. 4, one or more of the troughs 51 can terminate at a ridge 58 of the central section 54 formed at the flanges 57.

Bladders 40 are positioned within the troughs 51. The bladders 40 are inflatable members that include one or more vents 42 to receive air during inflation, and expel air during deflation. In one design, the bladder 40 is inflated with the top surface 43 of the bladders 40 is shaped to match the surface of the mandrel 50 when the bladders 40 are positioned in the troughs 51. The bladders 40 are configured to contact against and position the stringers 30 along the troughs 51.

One or more stringers 30 are positioned within each of the troughs 51. The stringers 30 include an elongated shape with a first section that is positioned in a trough 51 and a second section that extends outward away from the trough 51 and over the mandrel 50. The stringers 30 can be constructed from various materials. Examples include but are not limited to carbon fiber reinforced plastic (CFRP), carbon fiber reinforced polymer, carbon fiber reinforced thermoplastic, and fiberglass reinforced plastic (FRP).

The bladders 40 are configured to maintain and position the one or more stringers 30 relative to the mandrel 50. As illustrated in FIG. 4, the ends 31 of the stringers 30 are positioned within the troughs 51 and are spaced away from the ridge 58. The bladders 40 are positioned with the ends 41 positioned in closer proximity to the ridge 58. As illustrated in FIG. 4, the ends 41 of the bladders 40 can be positioned at the ridge 58. This position facilitates removal of the bladders 40 from the troughs 51 after curing of the composite material 60.

The first edge 23 of the plate 20 is spaced away from the ends 31 of the stringers 30. In one design, the first edge 23 is positioned 0.150" outward from the ends 31 of the stringers 30.

Receptacles 52 extend into the mandrel 50 between the troughs 51. The receptacles 52 are sized and positioned to receive the lugs 26 on the mold insert 10. In one design, the receptacles 52 are positioned at the ridge 58 of the mandrel 50.

One or more optical tooling points 53 are positioned on the mandrel 50. The optical tooling points 53 are spaced away from the receptacles 52 and the troughs 51.

As illustrated in FIG. 5, the mold insert 10 is configured to be mounted to the mandrel 50. The mold insert 10 extends over one or more troughs 51 and over one or more bladders 40. The mold insert 10 is positioned away from the stringers 30. The bladders 40 extend outward beyond the plate 20 with the ends 41 being exposed to facilitate removal from the mandrel 50. The plate 20 is also positioned away from the optical tooling points 53 on the mandrel 50 and the vents 42 on the bladders 40. The lugs 26 of the mold insert 10 seat within the corresponding receptacles 52 in the mandrel 50.

Fasteners 70 are mounted in the openings 82 and connect to the mandrel 50. The openings 82 can be counter-bored for the head of the fasteners 70 to be flush with or recessed below the outer side 22. This placement can facilitate automated fiber placement (AFP) or automated tape lamination (ATL) during application of the composite material 60.

The mold insert 10 is located on the mandrel 50 to be positioned along a faying surface of the composite material 60. In one design, the first edge 23 is positioned 0.150" past the stringer ends 31 and the faying surface begins 0.300" beyond the stringer ends 31.

As illustrated in FIGS. 4, 5, and 6, the thin first edge 23 of the plate 20 is positioned towards the center of the mandrel 50. The thin first edge 23 causes less undulations in the composite material 60 due to the transition in contact during formation from the bladder 40 to the mold insert 10. This prevents or reduces potential bow wave wrinkles from being created in the composite material 60.

The mold insert 10 is positioned on the mandrel 50 with the ramps 25 aligned with the troughs 51. The ramps 25 extend over the bladders 40 with the tapered shape of the ramps 25 contacting against the bladders 40. In one design, the troughs 51 ramp along the section that is covered by the mold inserts 10. The ramping of the troughs 51 matches that of the ramps 25. This permits the use of bladders 40 with constant cross-sectional size.

Figure 7:
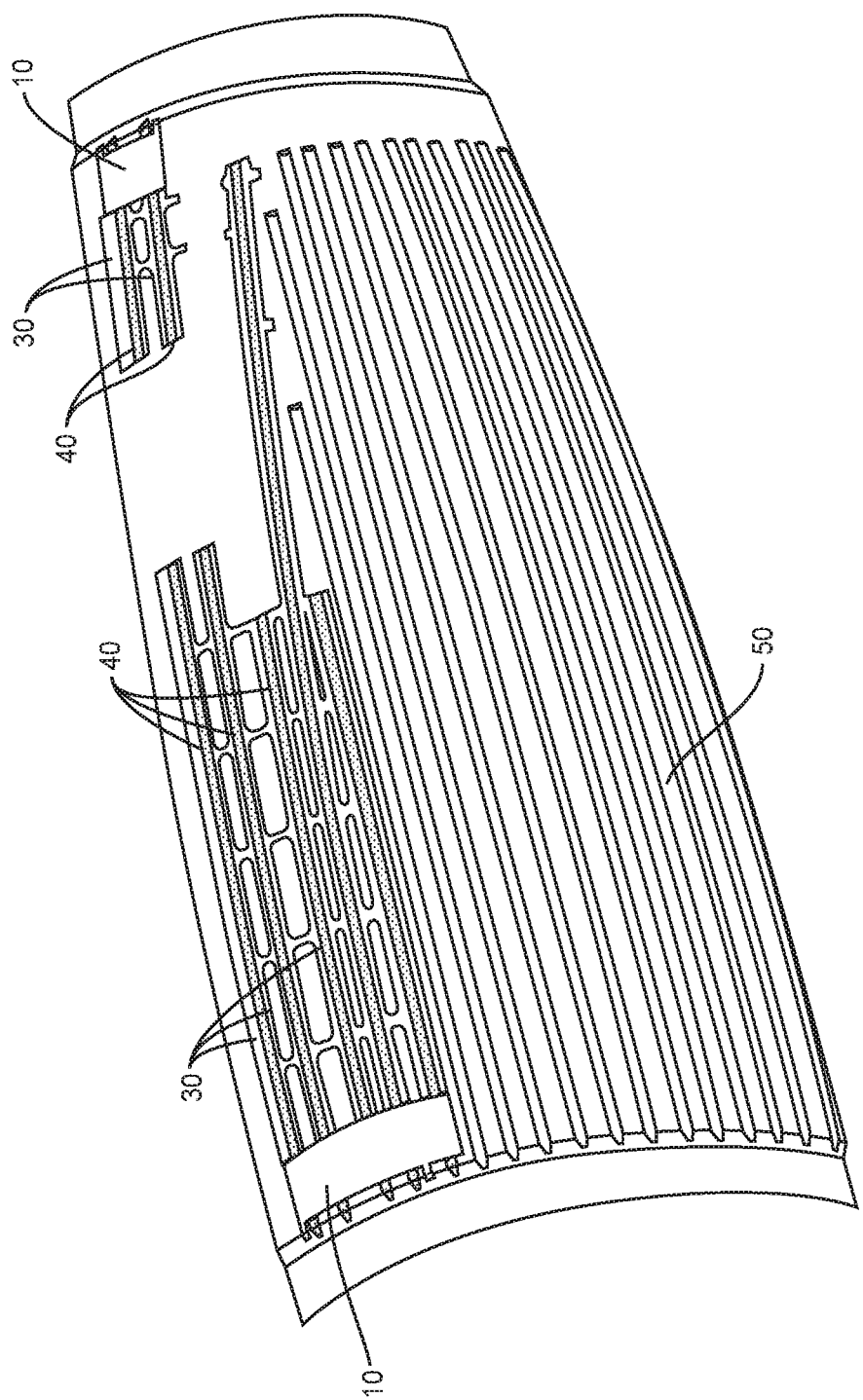
FIG. 7 is a perspective view of bladders and stringers positioned in troughs of a mandrel and a mold insert attached to the mandrel and extending over the bladders.

As illustrated in FIG. 7, multiple mold inserts 10 can be positioned along different sections of the mandrel 50. The different mold inserts 10 can include the same or different shapes, sizes, and configurations.

Figure 8:
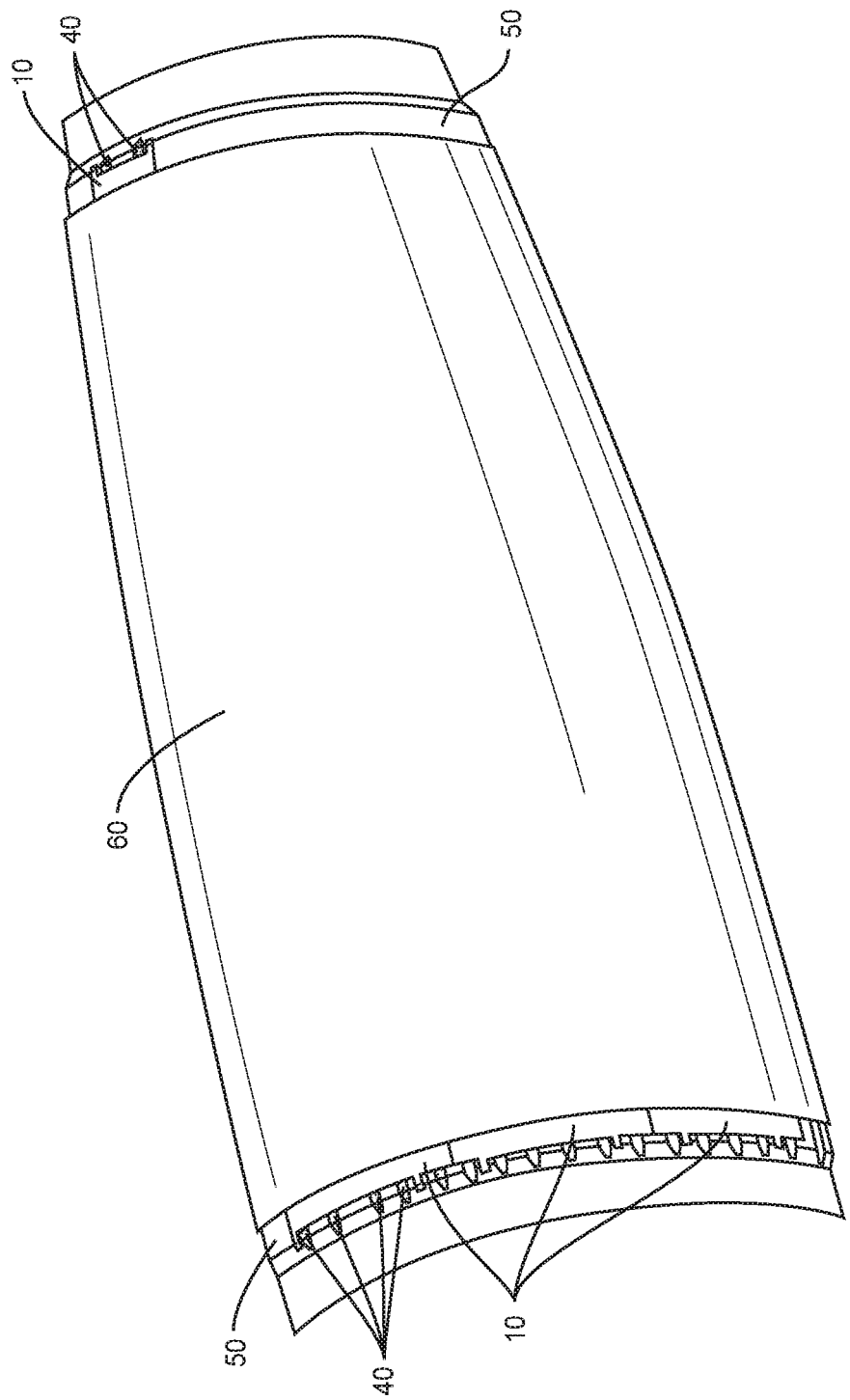
FIG. 8 is a perspective view of a composite material positioned on a mandrel.

As illustrated in FIG. 8, the composite material 60 is applied after the mold inserts 10 are mounted to the mandrel 50. The composite material 60 may be, for example without limitation, composite tape and/or composite fabric. The composite tape and composite fabric layer both may be made of the same type of materials or may be made from different materials depending on the particular implementation. These fabrics may include fibers and resins. The fibers may be, for example, carbon fibers. In these examples, the resins may be thermoset resins. A thermoset resin may be a resin that does not reflow or soften once it has been cured.

The composite material 60 is placed into an oven and cured with the one or more mold inserts 10 in place. The oven is configured to apply heat to cure the composite material 60. In one design, the oven is configured to provide temperatures of around three hundred fifty degrees to cure the composite material 60. The oven may also be an autoclave that applies pressure and heat. Various types of ovens can be used to cure the composite material 60. In addition to using an oven, other types of curing processes may be employed. For example, an electron beam system may be used to cure the composite material 60 instead of using a thermal curing system.

Figure 9:
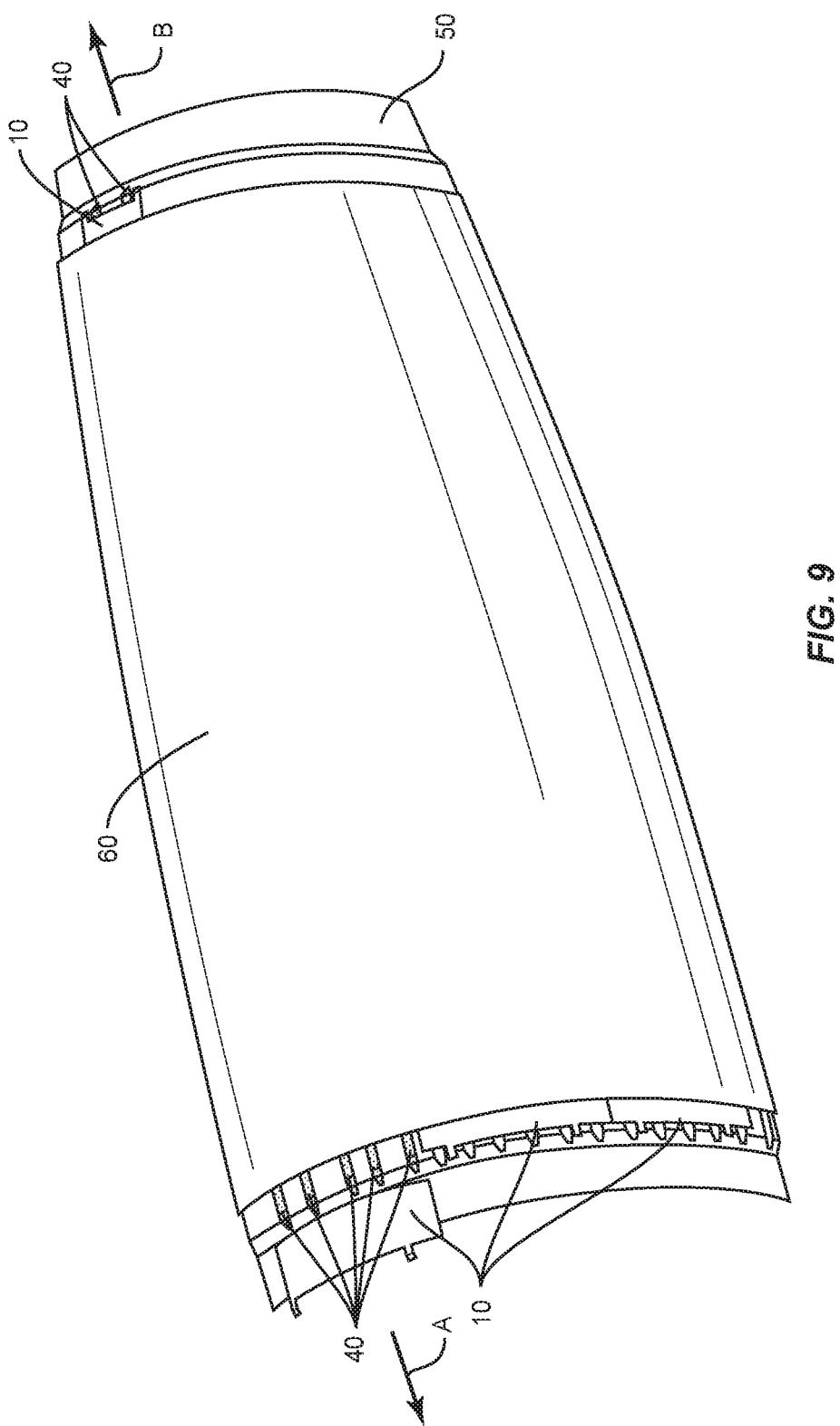
FIG. 9 is a perspective view of a mold insert being removed from a mandrel.

After curing, the one or more mold inserts 10 are removed from the mandrel 50 as illustrated in FIG. 9. This can include removing the one or more fasteners 70 from each of the one or more mold inserts 10. The mold inserts 10 are then slid outward from between the mandrel 50 and the cured composite material 60. As illustrated in FIG. 9, this includes sliding the mold inserts 10 on a first side of the mandrel 50 in the direction of arrow A. Mold inserts 10 on the opposing side of the mandrel 50 are slid outward in the direction of arrow B.

Figure 10:
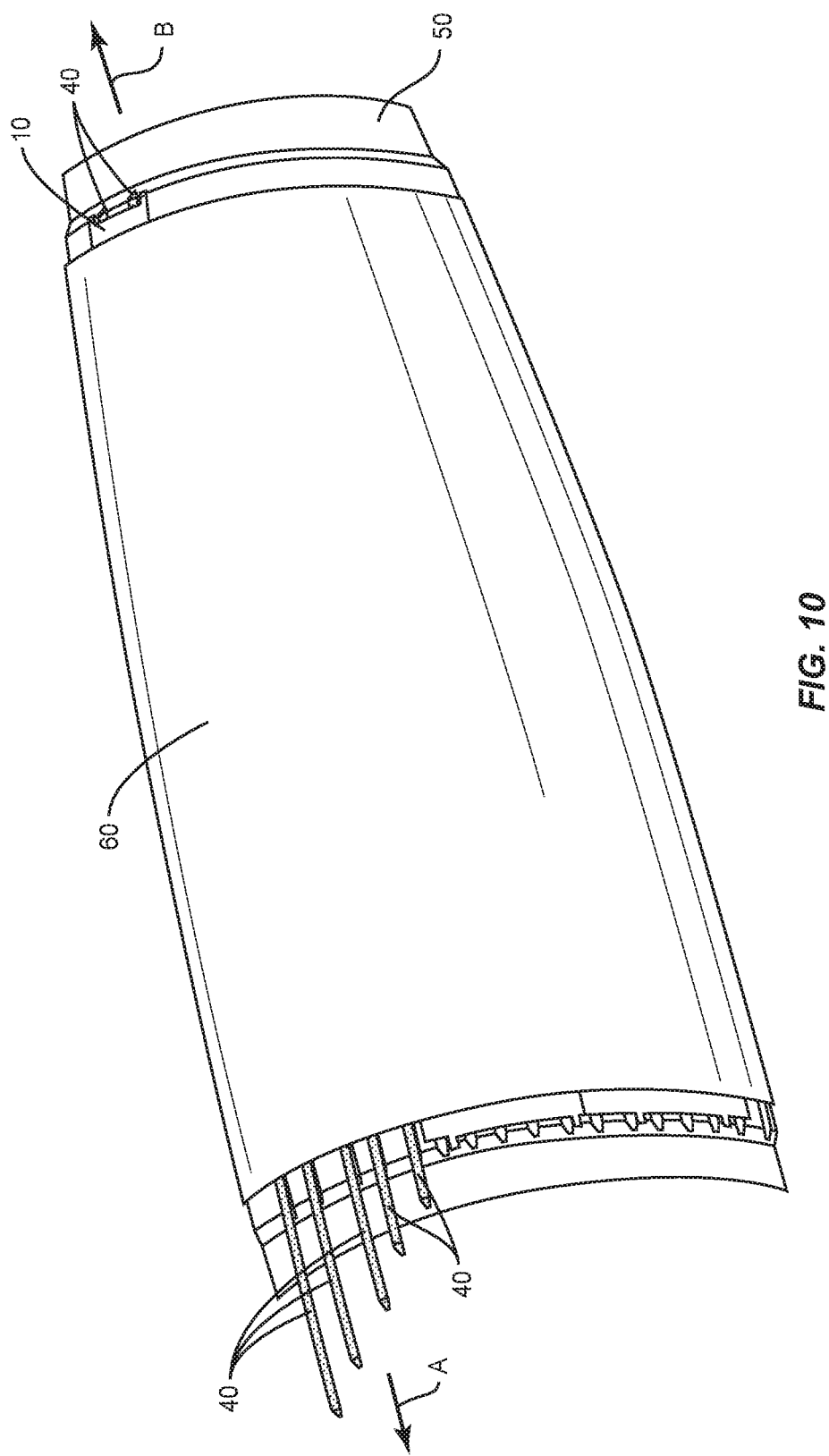
FIG. 10 is a perspective view of bladders being removed from a mandrel.

As illustrated in FIG. 10, the bladders 40 are withdrawn longitudinally from the troughs 51 in the direction of arrow A. Bladders 40 along the opposing side of the mandrel 50 are withdrawn longitudinally from the troughs 51 in the direction of arrow B.

Once the mold inserts 10 and bladders 40 are removed from the mandrel 50, the composite material 60 that forms a composite part is demolded from the mandrel 50.

Figure 11:
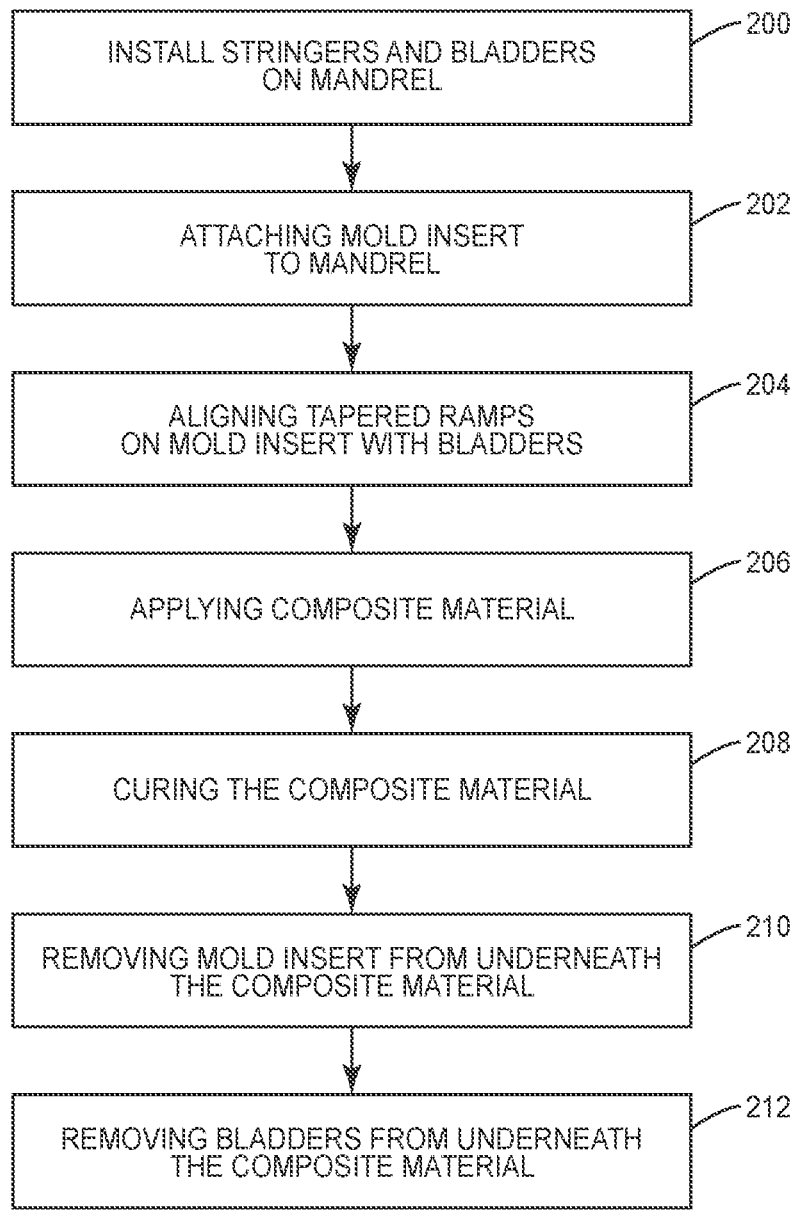
FIG. 11 is a flowchart diagram of a method of forming a composite component.

FIG. 11 illustrates the steps of a method of forming a composite structure. Stringers 30 and bladders 40 are installed into troughs 51 in a mandrel 50 (block 200). The stringers 30 and bladders 40 can be laterally spaced apart along the mandrel 50. A mold insert 10 is attached to the mandrel 50 (block 202). The mold insert 10 is positioned over one or more of the bladders 40. The mold insert 10 is positioned on the mandrel 50 with tapering ramps 25 on an inner side 21 aligned with the bladders 40 (block 204). A composite material 60 is applied onto the mandrel 50 (block 206). The composite material 60 extends over the stringers 30, the bladders 40, and the mold insert 10. The assembly including the mandrel 50, stringers 30, bladders 40, and mold insert 10 are cured (block 208). After the composite material 60 is cured, the method includes detaching the mold insert 10 from the mandrel 50 and sliding the mold insert 10 out from under the composite material 60 (block 210). The bladders 40 are slid out from under the material 60 (block 212).

Figure 12:
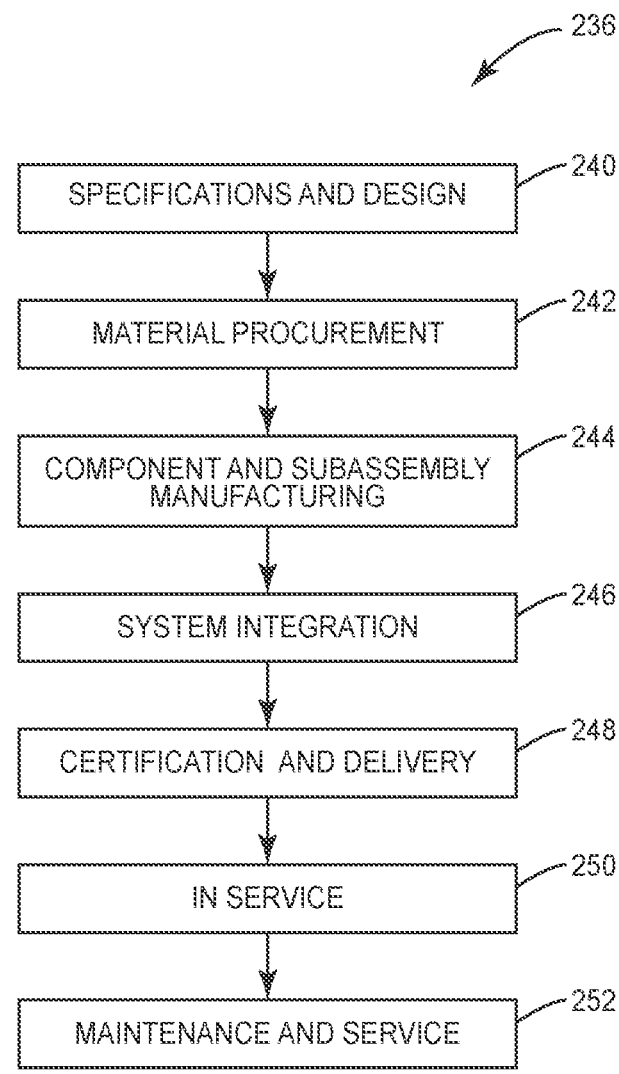
FIG. 12 is a flowchart diagram of a vehicle production and service methodology.
Figure 13:
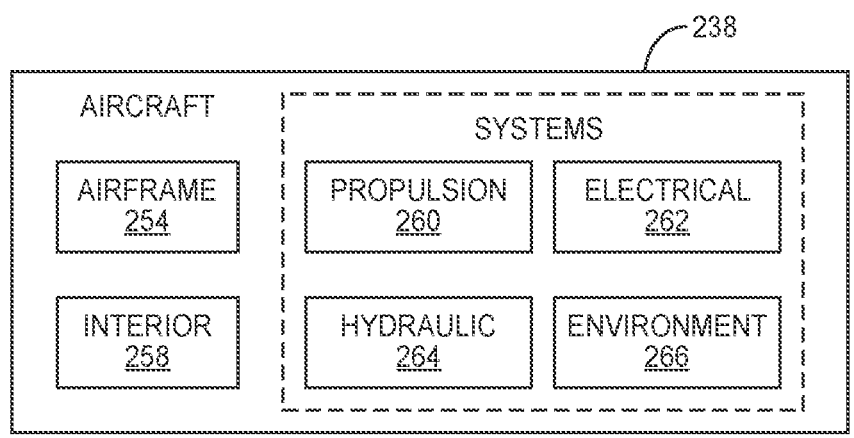
FIG. 13 is a block diagram of a vehicle.

The fabrication methodologies using the mold insert 10 with the mandrel 50 to make composite components can being used in the context of a vehicle manufacturing and service method 236 as illustrated in FIG. 12 and a vehicle 238 such as an aircraft as illustrated in FIG. 13. During pre-production, exemplary methods 236 can include specification and design 240 of the vehicle 238 and material procurement 242. During production, component and sub-assembly manufacturing 244 and system integration 246 of the vehicle 238 takes place. Thereafter, the vehicle 238 can go through certification and delivery 248 in order to be placed in service 250. While in service by a customer, the vehicle 238 is scheduled for routine maintenance and service 250, which can also include modification, reconfiguration, refurbishment, and so on.

The processes of method 236 can be performed or carried out by a system integrator, a third party, and/or an operator (e.g., a customer). For the purposes of this description, a system integrator can include without limitation any number of vehicle manufacturers and major-system subcontractors; a third party can include without limitation any number of vendors, subcontractors, and suppliers; and an operator can be an airline, leasing company, military entity, service organization, and so on.

As shown in FIG. 13, the vehicle 238 produced by exemplary method 236 can include an airframe 254 with a plurality of systems 256 and an interior 258. Examples of high-level systems 256 include one or more of a propulsion system 260, an electrical system 262, a hydraulic system 264, and an environmental system 266. Any number of other systems can be included. Although an aerospace example is shown, the principles of the disclosure can be applied to other industries, such as the marine and automotive industries.

Systems and methods embodied herein can be employed during any one or more of the stages of the production and service method 236. For example, components or subassemblies corresponding to component and subassembly manufacturing 244 can be fabricated or manufactured in a manner similar to components or subassemblies produced while the vehicle 238 is in service. Also, one or more apparatus embodiments, method embodiments, or a combination thereof can be utilized during the component and subassembly manufacturing 244 and system integration 246, for example, by substantially expediting assembly of or reducing the cost of a vehicle 238. Similarly, one or more of apparatus embodiments, method embodiments, or a combination thereof can be utilized while the vehicle 238 is in service, for example and without limitation, to maintenance and service 252.

The composite component made from the composite material 60 can be used for a variety of different parts of a vehicle 238, including but not limited to the fuselage, wing skin, and bulkhead of a vehicle. The composite component can be used on a variety of vehicles. One vehicle includes a commercial aircraft that includes rows of seats each configured to accommodate a passenger. Other vehicles include but are not limited to manned aircraft, unmanned aircraft, manned spacecraft, unmanned spacecraft, manned rotorcraft, unmanned rotorcraft, satellites, rockets, missiles, manned terrestrial vehicles, unmanned terrestrial vehicles, manned surface water borne vehicles, unmanned surface water borne vehicles, manned sub-surface water borne vehicles, unmanned sub-surface water borne vehicles, and combinations thereof.

The present disclosure can be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. A mold insert comprising:
    a plate with an inner side and an opposing outer side, the plate further comprising a first edge and an opposing second edge with each of the first and second edges extending between the inner and outer sides and positioned along an exterior of the plate;
    the plate having a tapering thickness measured between the inner and outer sides that increases from the first edge;
    ramps spaced-apart along the inner side, each of the ramps extending inward from the first edge towards the second edge, the ramps being recessed into the inner side and being sloped with a depth that decreases away from the first edge, the ramps comprising an exposed open end along the first edge;
    one or more indexing lugs that extend outward from the inner side and from the second edge.

2. The mold insert of claim 1, wherein the plate comprises a width measured between the first and second edges, each of the ramps extends a limited distance along the width from the first edge.

3. The mold insert of claim 1, wherein the plate comprises a length measured between a first lateral side and a second lateral side, the ramps being spaced apart along the length.

4. The mold insert of claim 1, wherein the plate further comprises non-tapered sections along the first edge laterally between the ramps, the non-tapered sections having a greater thickness than the ramps at the first edge.

5. The mold insert of claim 1, wherein the plate comprises a width measured between the first and second edges, the thickness of the plate tapering along a limited distance of the width from the first edge.

6. The mold insert of claim 1, wherein the plate comprises a width measured between the first and second edges, the thickness of the plate increases across the entire width.

7. The mold insert of claim 1, wherein the ramps are spaced inward from first and second lateral sides of the plate.

8. The mold insert of claim 1, wherein the ramps are spaced away from the second edge of the plate.

9. A mold system comprising:
    a mandrel with a length measured between first and second ends and a width measured between first and second sides, the mandrel comprising:
        a plurality of troughs that extend along the length and that are laterally spaced apart along the width;
        receptacles that are spaced away from the troughs;

a mold insert comprising:
- a plate with an inner side and an opposing outer side, a first edge and an opposing second edge, the plate having a thickness measured between the inner and outer sides that increases from the first edge;
- indexing lugs that extend outward from the inner side and are sized to fit within the receptacles;
- ramps spaced-apart along the inner side and that are recessed into the inner side of the plate;
- the mold insert configured to attach to the mandrel with the indexing lugs mounted in the receptacles to position the plate across the receptacles and the ramps over the troughs.

10. The mold system of claim 9, wherein the indexing lugs extend outward from the second edge of the plate and away from the first edge.

11. The mold system of claim 9, wherein the mandrel further comprises optical tooling points and with the mold insert spaced away from the optical tooling points when attached to the mandrel.

12. The mold insert of claim 11, wherein the troughs extend along an entirety of the central section.

13. The mold system of claim 9, wherein each of the ramps extends inward from the first edge towards the second edge, the ramps being recessed into the inner side and having a depth that decreases away from the first edge.

14. The mold system of claim 9, wherein the plate comprises a width measured between the first and second edges, each of the ramps extends a limited distance along the width from the first edge.

15. The mold insert of claim 9, wherein the plate further comprises non-tapered sections along the first edge laterally between the ramps, the non-tapered sections having a greater thickness than the ramps at the first edge.

16. The mold insert of claim 9, wherein the plate comprises a width measured between the first and second edges, the thickness of the plate tapers along a limited distance of the width from the first edge.

17. The mold insert of claim 9, wherein the ramps are spaced inward from first and second lateral sides of the plate.

18. The mold insert of claim 9, wherein the mandrel further comprises flanges positioned at each of the first and second ends with the troughs positioned along a central section between the flanges.

19. The mold insert of claim 9, wherein the ramps are spaced away from the second edge of the plate.

20. The mold insert of claim 9, wherein the plate comprises a width measured between the first and second edges, the thickness of the plate increases across the entire width.

\* \* \* \* \*